United States Patent
Top et al.

(10) Patent No.: US 11,455,617 B2
(45) Date of Patent: Sep. 27, 2022

(54) TYPE 4 NFC TAGS AS PROTOCOL INTERFACE

(71) Applicant: Visa International Service Association, San Francisco, CA (US)

(72) Inventors: Mustafa Top, Foster City, CA (US); Kiushan Pirzadeh, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 489 days.

(21) Appl. No.: 16/593,281

(22) Filed: Oct. 4, 2019

(65) Prior Publication Data
US 2021/0103915 A1   Apr. 8, 2021

(51) Int. Cl.
- G06Q 20/32   (2012.01)
- G06F 3/06    (2006.01)
- G06K 7/10    (2006.01)

(52) U.S. Cl.
CPC ....... G06Q 20/3278 (2013.01); G06F 3/0604 (2013.01); G06F 3/0655 (2013.01); G06F 3/0679 (2013.01); G06K 7/10297 (2013.01)

(58) Field of Classification Search
CPC .......... G06Q 20/3278; G06Q 20/3226; G06Q 20/327; G06Q 20/352; G06Q 20/367; G06F 3/0604; G06F 3/0655; G06F 3/0679; G06K 7/10297; G07F 7/0893; H04W 4/80; H04W 12/47; H04L 63/0492
USPC ........................................................ 711/103
See application file for complete search history.

(56) References Cited

U.S. PATENT DOCUMENTS

| | | | |
|---|---|---|---|
| 8,812,756 B2 * | 8/2014 | Chang ................... | G06F 21/606 710/33 |
| 2011/0022746 A1 | 1/2011 | Chang | |
| 2015/0189505 A1 * | 7/2015 | Marien ............... | H04L 63/0846 380/270 |
| 2016/0055480 A1 | 2/2016 | Shah | |

FOREIGN PATENT DOCUMENTS

EP   3614570 A1 *   2/2020   ......... G06K 19/0723

OTHER PUBLICATIONS

Extended European Search Report for App. No. EP20199551.1, dated Feb. 9, 2021, 12 pages.

* cited by examiner

*Primary Examiner* — Thien M Le
*Assistant Examiner* — Tae W Kim
(74) *Attorney, Agent, or Firm* — Loeb & Loeb LLP (57) ABSTRACT

NFC terminal devices and corresponding integrated circuit cards (ICCs) use NFC Type 4 tags as a protocol interface for complex or encrypted communication protocols that are not natively supported by the NFC terminal devices. A smartphone acting as an NFC terminal may block applications and/or protocols other than NFC data exchange formatted (NDEF) messages. An ICC applet supporting an advanced function uses designated memory locations for the transfer of commands normally supported at an application level. Both the terminal side and the ICC applet may check the designated memory locations for updated data in the absence of protocol-level message controls.

17 Claims, 7 Drawing Sheets

TYPE 4 NFC TAGS AS PROTOCOL INTERFACE

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many NFC contactless readers, including most cellular phones used as an NFC reader or terminal restrict communication with a target to an NFC Data Exchange Format (NDEF). The target may be an integrated circuit card (ICC), such as a smart card. Communications using other application types, including payment applications, are blocked or ignored, preventing operation of many complex applications.

SUMMARY

In an embodiment, a terminal application and a corresponding card applet communicate complex application commands using simple memory-write and memory-read commands that contain command and response application protocol data units (APDUs). The lack of full communication protocol support is solved by checking designated read and write memory locations for changes from known data that was previously placed in the designated memory locations.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

It is common for smart phones to be used as wireless payment devices in situations where the smart phone holds payment credentials, such as a credit card token. An application such as Google Pay or Apple Pay wirelessly interacts with a terminal via a near field communication (NFC) radio using a payment protocol such as Proximity Payment System Environment (PPSE). Similarly, some financial/payment smart cards, generically an integrated chip card (ICC), now support direct wireless interaction with a payment terminal using a similar PPSE protocol via an applet running on the card.

However, some smart phone manufacturers restrict the protocols available for interaction between the smart phone and a wireless ICC, even though, in theory, both are capable of supporting high level protocol interactions. In these cases, the smart phone may limit communication to a simple and limited NFC data exchange format (NDEF) and/or block non-NDEF communications. Without the ability to support advanced communication protocols many applications, including many cryptographic and financial products, simply cannot operate between the phone and the ICC. However, in more and more environments such as small retailers, a seller's smart phone may be the only payment vehicle available. If either the seller or a potential purchaser don't use a common person-to-person payment application and the smart phone technology blocks use of a common payment card, then the opportunity for an interaction is lost.

Figure 1:
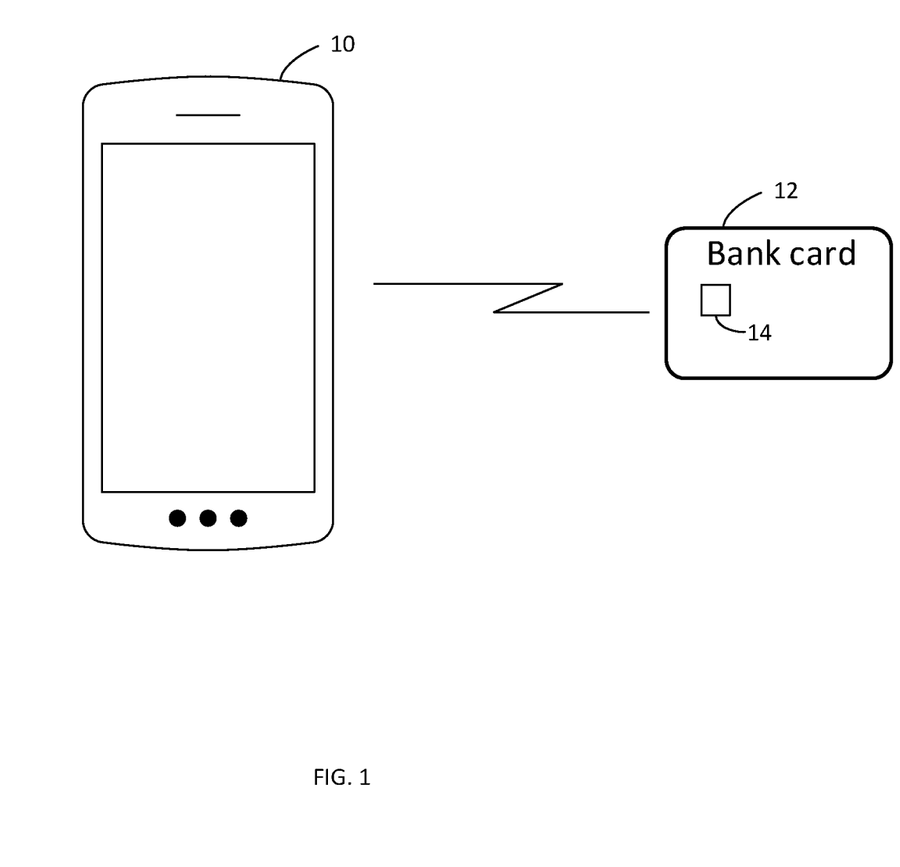
FIG. 1 is an illustration depicting the environment for the use of Type 4 NFC tags as a protocol interface in accordance with the current disclosure.

To overcome the technology shortfall of such smart phones, a technological solution is disclosed that allows use of complex applications over the simple NDEF protocol supported by the smart phone. FIG. 1 illustrates the technology environment supporting type 4 NFC tags as a protocol interface. A smart phone 10 may be in radio communication with an ICC 12. The ICC 12 may have a chip 14 supporting not only wireless communication such as ISO/IEC 14443 but also may have a secure element with a protected memory and a cryptographic processor as discussed below.

Figure 2:
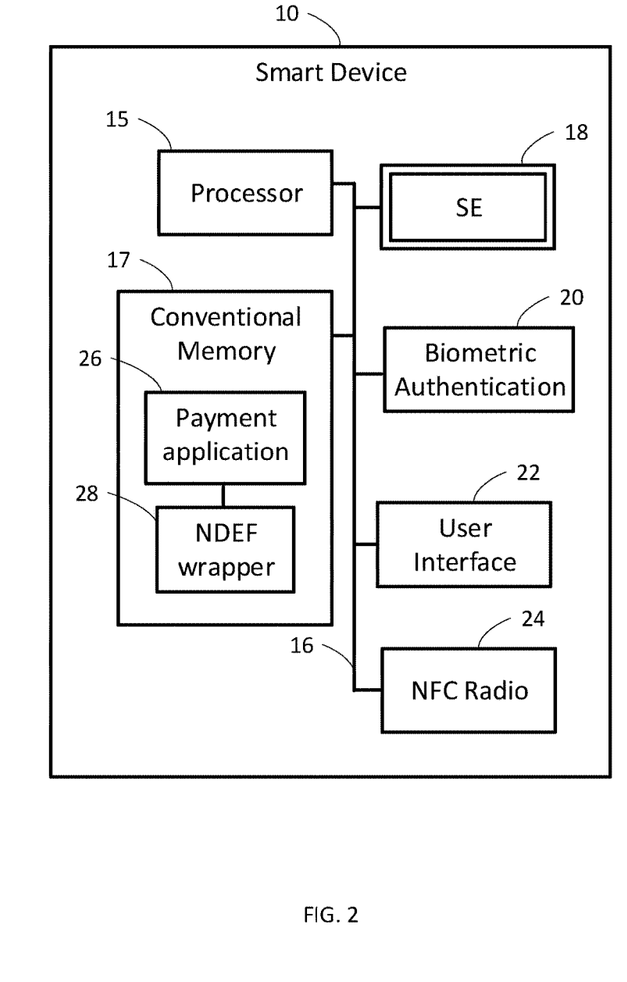
FIG. 2 is a block diagram of a terminal-side device in accordance with the current disclosure.

The smart phone 10 is illustrated in a simplified and exemplary form in FIG. 2. A processor 15 may communication via a data bus 16 with various components including a memory 17 and a secure element (SE) 18. The SE 18 may secure store data such as cryptographic keys and perform cryptographic functions such as key generation, random number (nonce) generation, encryption/decryption, signing, etc. A biometric authentication unit 20 may check a physical feature of a user such as a fingerprint or facial features to confirm identity. A user interface 22 may be or include a touch screen capable of presenting information and receiving input via voice or keystrokes. A near field communication (NFC) radio 24 may support limited distance communication with another device. In some embodiments, the NFC radio may be capable of providing a sufficient electric field to power up a chip 14 on a wireless ICC 12. Of course, other functional elements are present on a common smart phone 10 including multiple radios for local area and wide area communication, a power supply and battery, switches, and more. These are not depicted in the interest of simplicity and clarity with respect to the disclosure.

The memory 17 may include several programs that are not depicted, such as an operating system and various applications. An application relevant to the current disclosure may be a payment application 26. The payment application 26 may include an NDEF wrapper 28 sub-application. As illustrated in FIG. 2, the NDEF wrapper 28 is separate from the payment application 26 as a separate, callable application or module, but in other embodiments, the NDEF wrapper 28 may be part of the payment application 26. The roles and functions of the payment application 26 and the NDEF wrapper 28 are discussed in more detail below.

Figure 3:
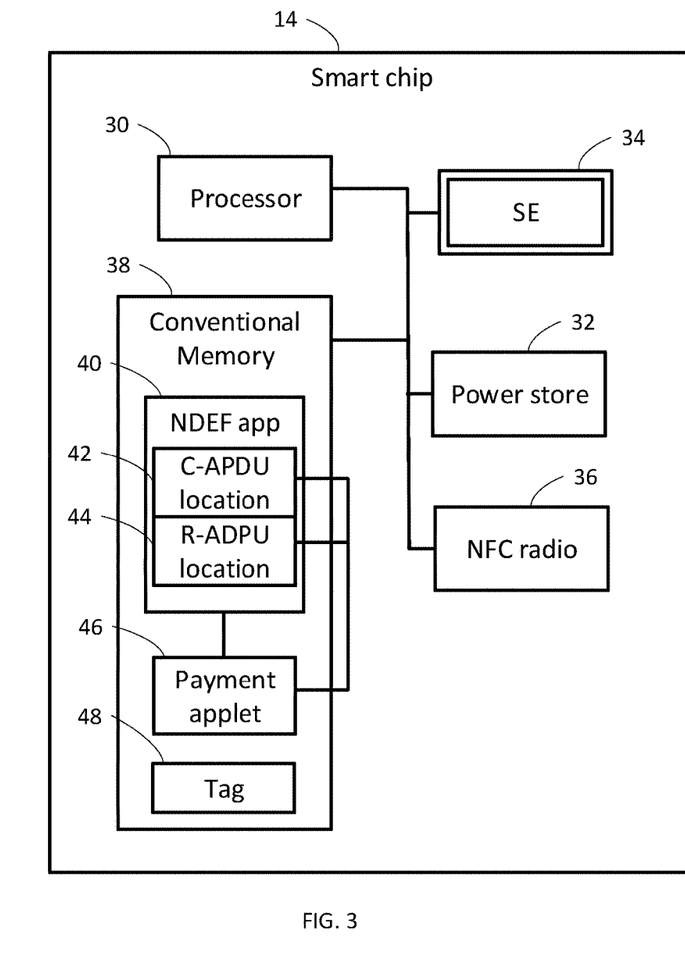
FIG. 3 is a block diagram of a chip used in a wireless integrated circuit card in accordance with the current disclosure.

A block diagram of an exemplary smart chip 14 embedded in the ICC 12 is illustrated in FIG. 3. The smart chip 14 may include a processor 30 coupled to various functional elements including a power store 32. The power store 32 may couple electric field energy from a nearby terminal via an antenna to a power storage device such as a capacitor. The power stored may be used to operate the chip 14 for the duration of a communication session with the terminal.

The smart chip 14 may also include a secure element 34 that is the same as or similar to the SE 18 of the smart phone 10 and may be capable of performing the same functions such as secure data storage and cryptographic functions. An NFC radio 36 may support wireless communication with the smart phone 10 or another terminal, such as a point-of-sale terminal in a retail outlet or an access control reader at a secure door passage. In some embodiments, the NFC radio supports an ISO/IEC 14443 protocol, although other protocols may be supported.

A memory 38 may include several programs or modules not depicted for clarity such as an operating system like JavaCard and other utilities. The memory 38 may include an NDEF application 40 including a first memory location 42 designated by convention for storing a single command application protocol data unit (C-APDU) and a second memory location 44 designated by convention for storing a single response application data unit (R-APDU). A payment applet 46 may support interactions with a payment application including authentication with a corresponding terminal-side payment application, transaction signing, and token exchange. In some embodiments, the payment application may comply with an EMV® payment specification for contactless payment.

Figure 4:
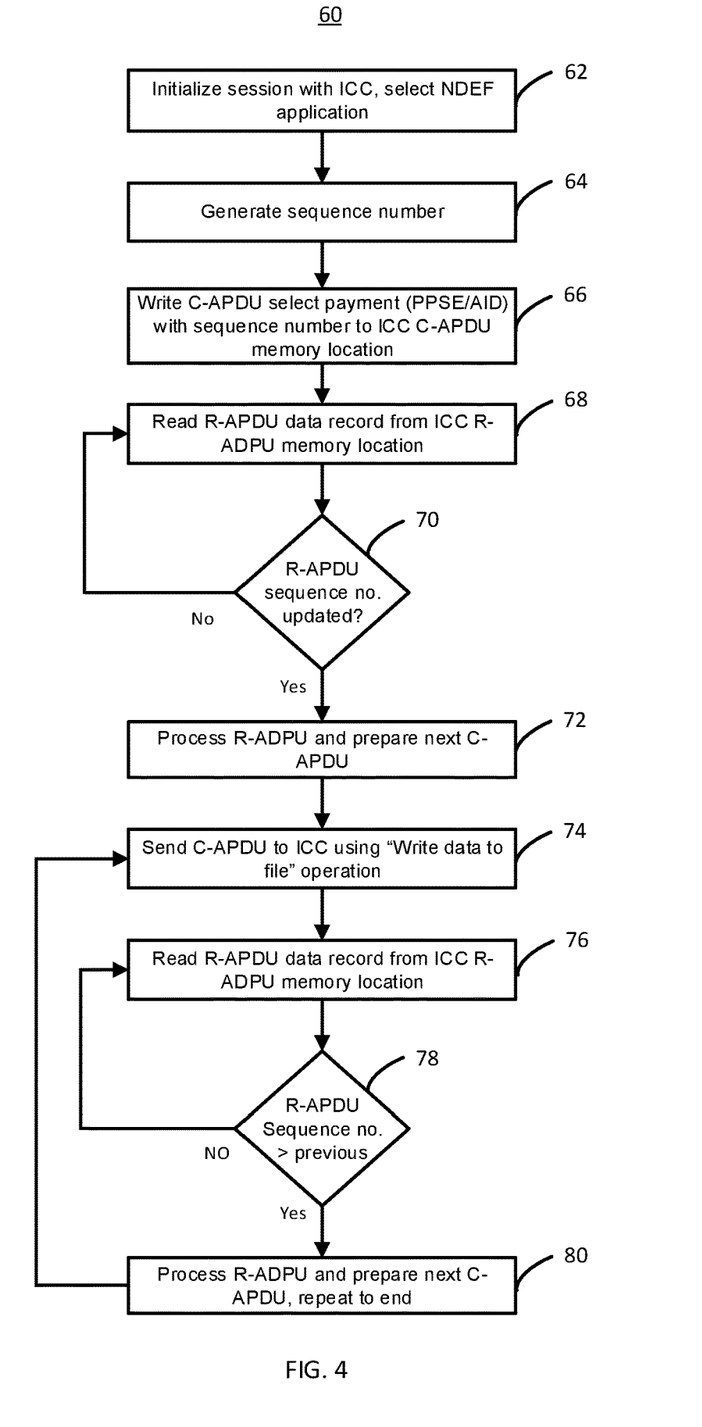
FIG. 4 is a flow chart illustrating a method performed on a terminal-side device supporting Type 4 NFC tags as a protocol interface using a sequence number.

FIG. 4 is a flowchart of an exemplary method 60 for terminal-side communication between a terminal 10 and a card 12 using a sequence number when the terminal 10 doesn't support or actively blocks communication functions other than simple memory-write and memory-read (that is, NDEF type 4 tags). At block 62, the payment application 26 on the smart phone 10, acting as a terminal, may attempt to initialize a session with the ICC 12 such as sending a proximity payment system environment (PPSE) request. If the protocol request is blocked by the phone operating system, an alternate communication protocol using the NDEF wrapper 28 may be invoked.

At block 64, the NDEF application 40 as part of the initialization may generate a sequence number, for example requesting a base number from the SE 34. The sequence number may be included with the first C-APDU command written to the ICC. The ICC will use this initial sequence number as a base and may increment the sequence number for inclusion with each subsequent response. The sequence number may persist, that is, increment from the initial number with each subsequent message sent during the transaction. The sequence number helps determine when new messages are available and also aids in determining that no message has been lost. In this embodiment, the tag memory location 48 may not be used. The tag memory location is discussed in more detail with respect to FIG. 5.

The payment application 26 at block 66 may write a C-APDU with the first sequence number to the first memory location 42 using an NDEF 'write memory' command. The response at the card 12 is discussed below with respect to FIG. 6, but in brief, the card operating system (not depicted) may initialize the NDEF application in response to the card being powered up or in response to the data write to the first memory location 42. The NDEF application 40 may be programmed to recognize the first memory location and instantiate the payment applet 46.

Once the payment application 46 is active, the first memory location 42 may be read, interpreted, and processed, resulting in an R-ADPU being written to the second memory location 44. Subsequent to writing the C-APDU to the first memory location 42, at block 68, the payment application 26 may begin to read the data from the second memory location 44.

Because there is no higher level protocol communication between the payment application 26 and the payment applet 46, there is no signaling to indicate whether a response to the C-APDU has been generated. To address that messaging deficiency, at block 70, the payment application 26 may determine if the sequence number in the R-APDU has been incremented when compared to a previous message. If not, the payment applet 46 has not yet responded to the C-APDU and the "no" branch may be taken back to block 68. If the sequence number has been incremented, the payment applet 46 has responded and execution may follow the 'yes' branch to block 72. There, the value of the second memory location 44 may be processed as a response to the original C-APDU. The payment application 26 may generate a subsequent C-APDU and at block 74 the payment application, via the NDEF wrapper 28 may write the C-APDU to the first memory location 42 on the smart chip 14.

At block 76, the payment application 26 may read the second memory location 44 and as above, at block 78, determine if the sequence number has been incremented, indicating an response to the most recent C-APDU. If the contents have not changed, execution continues back at block 76. If the contents have changed, execution may continue at block 80, where the R-APDU may be processed and another C-APDU generated, if necessary. Execution may continue at block 114 until all the communication required for completion of the requested function is accomplished. Using this technique, the smart phone 10 may imitate an actual contactless payment transaction absent any direct communication between the payment application 26 on the smart phone 10 and the payment applet 46 on the ICC 12.

Figure 5:
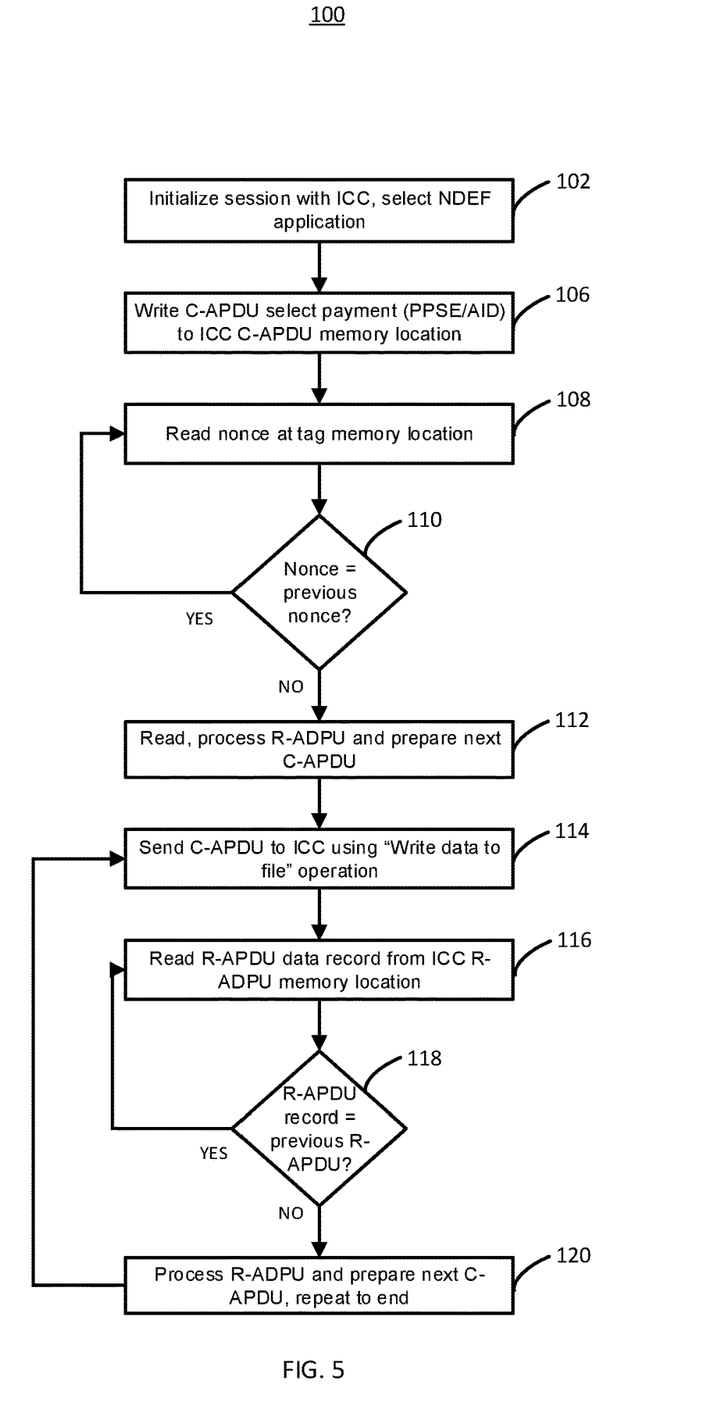
FIG. 5 is a flow chart illustrating a method performed on a terminal-side device supporting Type 4 NFC tags as a protocol interface using a nonce.

FIG. 5 is a flowchart of an exemplary method 100 for terminal-side communication between a terminal 10 and a card 12 using a nonce when the terminal 10 doesn't support or actively blocks communication functions other than simple memory-write and memory-read (that is, NDEF type 4 tags). At block 102, the payment application 26 on the smart phone 10, acting as a terminal, may attempt to initialize a session with the ICC 12 such as sending a proximity payment system environment (PPSE) request. If the protocol request is blocked by the phone operating system, an alternate communication protocol using the NDEF wrapper 28 may be invoked.

At block 104, the NDEF application 40 as part of the initialization may generate a nonce or random number from the SE 34. The nonce may be written to a tag memory location 48 on the smart chip 14. The nonce may be written to the tag memory location 48 prior to any other activity so that the payment application 26, by comparing the nonce to a previous nonce can identify whether the payment applet 46 on the ICC 12 has updated the second memory with a new response. This may help rule out interpreting data left over from a previous session as being a valid response to a subsequent C-APDU sent by the payment application 26.

The payment application 26 at block 106 may write a C-APDU to the first memory location 42 using an NDEF 'write memory' command. The response at the card 12 is discussed below with respect to FIG. 5, but in brief, the card operating system (not depicted) may initialize the NDEF application in response to the card being powered up or in response to the data write to the first memory location 42. The NDEF application 40 may be programmed to recognize the first memory location and instantiate the payment applet 46.

Once the payment application 46 is active, the first memory location 42 may be read, interpreted, and processed, resulting in an R-ADPU being written to the second memory location 44. Subsequent to writing the C-APDU to the first memory location 42, at block 108, the payment application 26 may begin to read the data from the tag memory location 48.

Because there is no higher level protocol communication between the payment application 26 and the payment applet 46, there is no signaling to indicate whether a response to the C-APDU has been generated. To address that messaging deficiency at the beginning of the transaction, at block 110, the payment application 26 may determine if the tag memory location 48 contains an updated nonce when compared to a previous message. If not, the payment applet 46 has not yet responded to the first C-APDU and the "yes" branch may be taken back to block 108. If the nonce has been overwritten, the payment applet 46 has responded to the first payment transaction command and execution may follow the 'no' branch to block 112. There, the value of the second memory location 44 may be processed as a response to the original C-APDU. The payment application 26 may generate a subsequent C-APDU and at block 114 the payment application, via the NDEF wrapper 28 may write the C-APDU to the first memory location 42 on the smart chip 14.

Figure 6:
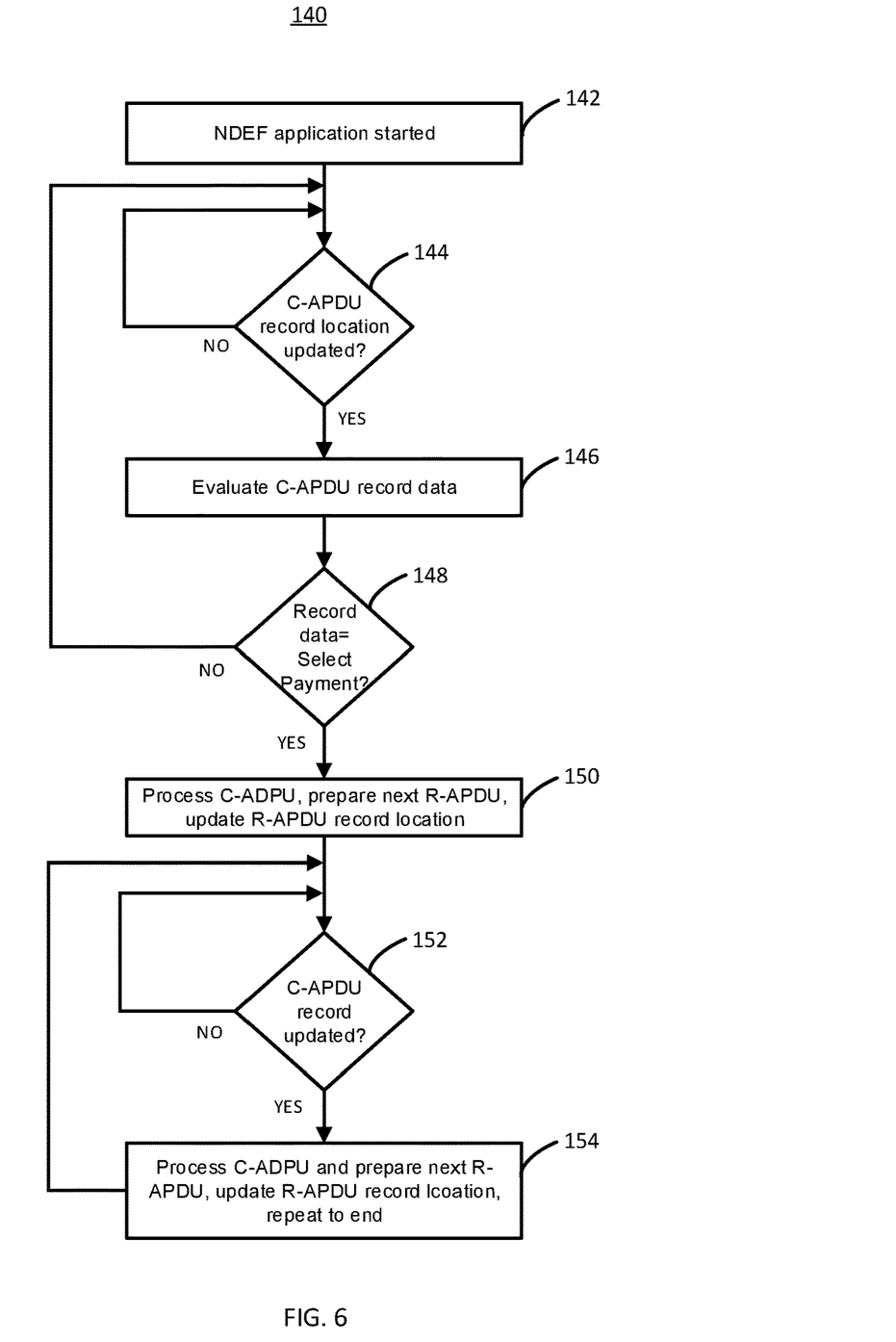
FIG. 6 is a flow chart illustrating a method performed on the chip of the ICC supporting Type 4 NFC tags as a protocol interface.

At block 116, the payment application 26 may read the second memory location 44 and as above, at block 118, determine if the contents have changed, indicating an response to the most recent C-APDU. If the contents have not changed, execution continues back at block 116. If the contents have changed, execution may continue at block 120, where the R-APDU may be processed and another C-APDU generated, if necessary. In an embodiment, the nonce in the tag memory location 48 may be updated for each R-APDU written by the ICC. Execution may continue at block 114 until all the communication required for completion of the requested function is accomplished. Using this technique, the smart phone 10 may imitate an actual contactless payment transaction absent any direct communication between the payment application 26 on the smart phone 10 and the payment applet 46 on the ICC FIG. 6 is a flowchart of an exemplary method 140 illustrating activity on the ICC 12 associated with using Type 4 NFC tags as a protocol interface for the smart phone payment application 26 and the ICC payment applet 46. At block 142, the NDEF application 40 may be activated as a result of a trigger. The trigger may be the card 12 being powered up, a write to the first or second memory locations, or another activity. In embodiments using a nonce rather than a sequence number, the initialization may include generating and writing a nonce to the tag memory location 48, as described above.

At block 144, the payment applet 46 may compare the contents of the first memory location 42 to a previous value of the first memory location 42 or may evaluate the memory by other means to determine if an update has been made. If the memory has been updated by new data, the contents may be read and evaluated as a C-APDU by the payment applet 46. If the C-APDU is a select payment APDU, the 'yes' branch may be taken to block 150. If the C-APDU is not a select payment APDU, the 'no' branch may be taken and another C-APDU may be read at block 146. Block 148 may evaluate whether the C-APDU is a select payment command. If not, execution may return to below block 142. If so, execution may continue at block 150.

Processing the C-APDU at block 150 may involve reading and parsing the C-APDU and preparing a response R-APDU. Preparing the response may involve any number of processes including, but not limited to, preparing a signed and/or encrypted payment packet following a conventional payment protocol such as an EMV® wireless payment protocol and the sequence number. After the R-APDU payload is prepared, the R-APDU may be written to the second memory location 44 with a sequence number. As discussed above, the sequence number may start with a base number (such as 1) and be incremented for each message transmitted between two endpoints, in this case the terminal 10 and card 12.

Similar to the loop at block 144, the payment applet 46 may then begin reading the first memory location 42 at block 152 to determine if a new C-APDU has been written by the terminal 10. If not, the first memory location 42 may be read after a time delay. If so, execution may continue at block 154 where the new C-APDU may be evaluated and a response prepared, if any. The process of waiting for a new C-APDU may be continued until processing for the current operation is completed. Using this technique, the payment applet 46 may be able to complete a complex operation absent any signaling between the payment application 26 and the payment applet 46.

Figure 7:
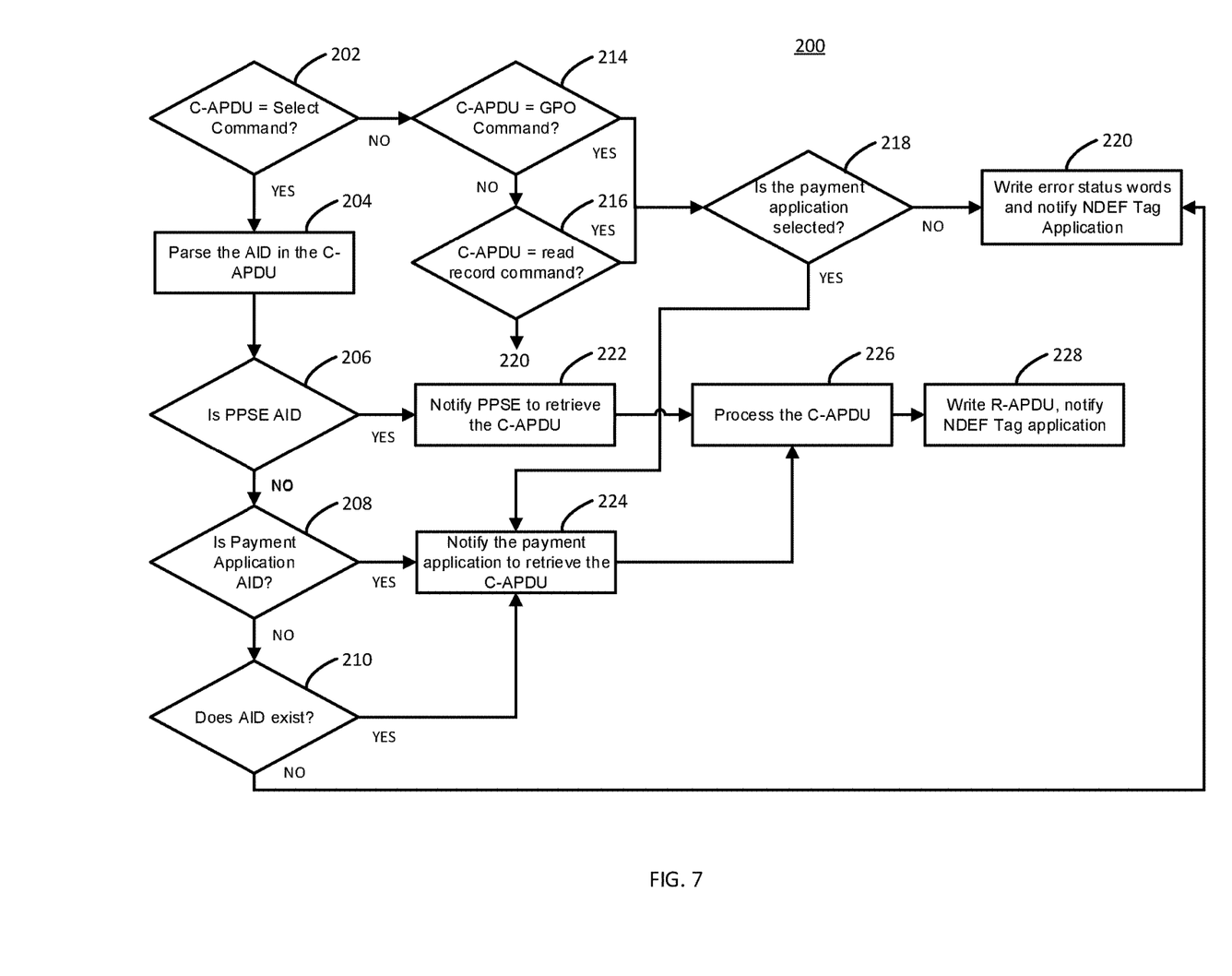
FIG. 7 is a decision tree illustrating steps of a card-side applet supporting Type 4 NFC tags as a protocol interface.

FIG. 7 is an exemplary illustration of processing flow 200 for the payment applet 46. This flow 200 assumes the NDEF application 40 is managing the interactions with the corresponding NDEF application/wrapper 28 on the smart phone/terminal 10.

At block 202, the applet 46 looks for a select command. If it is present, execution continues at block 204 where an application identifier (AID) is parsed. If, at block 206, the AID is a PPSE, a PPSE module may be activated to retrieve the C-APDU from the first memory location 42 at block 222. At block 226, the C-APDU may be processed and, at block 228, a responsive R-APDU with the sequence number may be written to the second memory location 44.

If, at block 206, the AID is not a PPSE, at block 208 the AID may be evaluated to determine if it is a payment application AID. If so, the corresponding payment application may be activated and the C-APDU retrieved from the first memory location 42. Processing may then continue at block 226 as described above.

If the AID is not a payment application at block 208, execution may continue at block 210 to determine if the AID exists. If so, the corresponding application may be instantiated and that application may retrieve and process the C-APDU from blocks 224 forward. If the AID does not exist at block 210, the 'no' branch may be followed and an appropriate error status word may be written to the second memory location 44.

Returning to block 202, when the C-APDU is not a select command, at block 214, the C-APDU may evaluated to determine if it is a 'get processing option' (GPO) command. If so, processing may continue at block 218 to determine if the payment application is already selected. If so, processing may continue at block 224 as described above, resulting in a new R-APDU being written to the second memory location 44. If, at block 214, the C-APDU is not a GPO command, execution may continue at block 216 where a determination may be made if the C-APDU is a read record command. If so, execution may continue at block 218. If not, an error may be written via block 220. Returning to block 218, if no payment application is selected, the 'no' branch may be followed to block 220 and an error word may be written to the second memory location 44.

A technical problem arises when a device, such as a smart phone 10, blocks protocols required for certain applications to communicate. A system and method in accordance with the current disclosure provides a technical solution to that problem by adopting a polling process over a simplistic file read/write protocol to allow communication between two modified endpoint applications. The modifications on each endpoint support reversion to the lower level protocol while still supporting the higher level protocols when available.

A system and method in accordance with the current disclosure benefits smart phone users, payment card users, and payment card issuers. Smart phone users are no longer blocked from using their devices as payment terminals for complex NFC transactions, for example, allowing acceptance of NFC-enabled payment cards for completing financial transactions. Card holders benefit from the acceptance of their cards at additional vendors while card issuers see the value of their brands enhanced by this additional use capability.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:

1. A method of communicating application data between an NFC terminal and an integrated circuit card (ICC), the method including:
   designating a first memory location on the ICC and a second memory location on the ICC, the first memory location designated for storing a one command application data unit (C-APDU), the second memory location designated for storing one response application data unit (R-APDU);
   writing, by the application on the NFC terminal, a first C-APDU to the first memory location, the first C-APDU containing a first sequence number;
   reading, by the application on the NFC terminal from the second memory location, a first R-APDU, the first R-APDU containing a second sequence number, the second sequence number greater than the first sequence number;
   responsive to the second sequence number in the R-ADPU being greater than the first sequence number, processing the R-APDU at the application on the NFC terminal;
   generating, by the application on the NFC terminal, a subsequent C-APDU;
   writing, by the application on the NFC terminal, the subsequent C-APDU to the first memory location on the ICC;
   reading the second memory location on the ICC via the application on the NFC terminal after writing the subsequent C-APDU to the first memory location of the ICC;
   comparing a contents of the second memory location to the first R-APDU; and
   repeating the steps of reading the contents of the second memory location on the ICC and comparing the contents of the second memory to the first R-APDU until the contents of the second memory do not equal the first R-APDU;
   processing the contents of the second memory as a second R-APDU; and
   completing communication between the application on the NFC terminal and an applet on the ICC using successive data transfers via the first memory location for data for C-APDU data sent from the NFC terminal to the ICC and the second memory location for R-APDU data read from the ICC.

2. The method of claim 1, further comprising generating the first sequence number at the NFC terminal prior to generating the first C-APDU to send to the ICC.

3. The method of claim 1, further comprising:
   reading data the first memory location via the applet on the ICC;
   evaluating the data as a C-APDU as part of a payment process;
   processing the R-APDU responsive to requirements associated with the C-APDU; and
   writing the R-APDU to the second memory location, overwriting any existing data in the second memory location.

4. The method of claim 1, further comprising:
   encrypting the first C-APDU prior to writing to the first C-APDU to the first memory location.

5. The method of claim 1, wherein writing, by the application on the NFC terminal, the first C-APDU to the first memory location comprises writing the first C-APDU using a NFC Type 4 tag write memory command.

6. The method of claim 1, wherein reading the first R-APDU by the application on the NFC terminal comprises reading the first R-APDU using a NFC Type 4 tag read memory command.

7. A system for transferring application session data during an application session between an NFC terminal and an integrated circuit card (ICC), comprising:
   a first memory location on the ICC that stores data accessible to both the ICC and the NFC terminal, the first memory location used by convention for storing a command application data unit (C-APDU);
   a second memory location on the ICC that stores data accessible to both the ICC and the NFC terminal, the second memory location used by convention for storing a response application data unit (R-APDU);
   the NFC terminal executing an application, the application performing steps:
      generating a unique number associated with the application session;
      generating a first C-APDU;
      writing the first C-APDU to the first memory location;
      reading the second memory location;

determining that the second memory location contains an R-APDU; and processing the R-APDU, and an applet on the ICC, the applet performing the steps:

checking the first memory location for a change from a previous value;

responsive to a new value at the first memory location, processing the contents of the first memory location as a C-APDU;

generating an R-APDU responsive to the C-APDU; and writing the R-APDU to the second memory location on the ICC, overwriting any previous data in the second memory location.

8. The system of claim 7, wherein the applet contains a payment function and an NDEF function, the NDEF function responsive to a trigger caused by data being written to the first memory location and a payment function performing transaction-related processing for responding to C-APDUs related to a payment request.

9. The system of claim 7, further comprising launching the applet on the ICC responsive to an NFC Data Exchange Format (NDEF) message being written to the first memory.

10. The system of claim 7, wherein the unique number is a nonce, the method further comprising writing a tag memory location with the nonce, wherein determining that the second memory location contains an R-APDU comprises determining that the tag memory has a new nonce.

11. The system of claim 7, wherein the unique number is a sequence number that is incremented for each message transmission, the sequence number included in the C-APDU.

12. The system of claim 7, wherein the unique number is a sequence number that is incremented for each message transmission, the sequence number included in the R-APDU.

13. The system of claim 7, wherein the R-APDU contains a personal account number associated with the ICC, the ICC being a bank payment card.

14. A method of communicating application protocol data between an NFC terminal and an integrated circuit card (ICC), the method including:

reserving a first memory location on the ICC for receiving data from the NFC terminal;

reserving a second memory location on the ICC for sending data to the NFC terminal;

activating a payment applet on the ICC responsive to data being written to the first memory location, wherein activating the payment applet on the ICC comprises setting a flag on the first memory location to activate the payment applet responsive to receipt of data at the first memory location;

i) responsive to determining a contents of the first memory location is different from a previous contents of the first memory location, parsing the memory contents of the first memory location into a command application protocol data unit (C-APDU);

ii) processing the C-APDU via the payment applet to generate a response application protocol data unit (R-APDU); and writing the R-APDU to the second memory location, wherein the steps i and ii are repeated to a programmatic end of a data processing function of the applet with the NFC terminal.

15. The method of claim 14, wherein the ICC is a payment card.

16. The method of claim 14, wherein a protocol used to read and write data to the first and second memory locations is an NFC data exchange (NDEF) protocol.

17. The method of claim 14, wherein the R-APDU is an error message responsive to the C-APDU being unparsable.

* * * * *